US006752463B2

(12) United States Patent
Nivet

(10) Patent No.: US 6,752,463 B2
(45) Date of Patent: Jun. 22, 2004

(54) DEVICE FOR MANAGING THE KINEMATICS OF A SEAT WITH MOBILE SEATING ELEMENT

(75) Inventor: Laurent Nivet, Asnieres (FR)

(73) Assignee: Labinal, Montigny-le-Bretonneux (FR)

( * ) Notice: Subject to any disclaimer, the term of this patent is extended or adjusted under 35 U.S.C. 154(b) by 0 days.

(21) Appl. No.: 10/069,298

(22) PCT Filed: Jun. 19, 2001

(86) PCT No.: PCT/FR01/01918

§ 371 (c)(1),
(2), (4) Date: Feb. 25, 2002

(87) PCT Pub. No.: WO02/00464

PCT Pub. Date: Jan. 3, 2002

(65) Prior Publication Data

US 2002/0105212 A1 Aug. 8, 2002

(30) Foreign Application Priority Data

Jun. 29, 2000 (FR) .......................................... 00 08423

(51) Int. Cl.$^7$ ................................................ B60N 2/02
(52) U.S. Cl. ................ 297/423.3; 297/330; 297/423.36
(58) Field of Search ............................. 297/330, 423.3, 297/423.36, 362.11

(56) References Cited

U.S. PATENT DOCUMENTS

| | | | | |
|---|---|---|---|---|
| 3,794,381 A | * | 2/1974 | Caldemeyer | ........... 297/423.22 |
| 5,467,002 A | * | 11/1995 | Brooks | ........................ 318/553 |
| 5,651,587 A | * | 7/1997 | Kodaverdian | .......... 297/423.36 |
| 5,755,493 A | * | 5/1998 | Kodaverdian | .......... 297/423.36 |
| 5,887,949 A | * | 3/1999 | Kodaverdian | .......... 297/423.36 |
| 6,194,853 B1 | * | 2/2001 | Tual et al. | ................... 318/266 |
| 6,441,576 B1 | * | 8/2002 | Marin-Martinod et al. | ...... 318/568.1 |

FOREIGN PATENT DOCUMENTS

| | | | |
|---|---|---|---|
| FR | 2799164 | * | 10/1999 |
| FR | 2808175 | * | 4/2000 |
| WO | WO 9742050 | * | 11/1997 |

* cited by examiner

Primary Examiner—Peter M. Cuomo
Assistant Examiner—Joseph Edell
(74) Attorney, Agent, or Firm—Stites & Harbison PLLC; Douglas E. Jackson

(57) ABSTRACT

The method of managing the kinematics of a seat (10) includes at least three seat elements (16, 18, 22) able to move with respect to each other and at least two actuators (26, 27) for moving the three elements (16, 18, 22) with respect to each other. When a first actuator (27) is actuated in at least one direction, it includes a step of actuating a second actuator (26) first of all in a given direction and then in the opposite direction.

11 Claims, 3 Drawing Sheets

DEVICE FOR MANAGING THE KINEMATICS OF A SEAT WITH MOBILE SEATING ELEMENT

The present invention concerns a method for managing the kinematics of a seat having at least three seat elements able to move with respect to each other and at least two actuators for moving the three elements with respect to each other.

This method applies notably to vehicle seats able to be used notably in aircraft for transporting passengers.

These seats generally have a squab which can be moved with respect to the base. An inclinable back rest is articulated at one end of the squab, whilst at its other end there is articulated a leg rest extended by a movable foot rest.

Electrical actuators equip the seat, in order to move the different elements thereof with respect to each other.

In some seats, the height of the squab can be modified by virtue of the movement possible between the squab and the base of the seat. The movement can be effected by means of a specific actuator located between the squab and the base. It can also result from the mechanical structure of the seat which mechanically connects the squab to another element of the seat, and for example its back rest. Thus, for example, when the seat back rest is moved to its upright position, the squab is simultaneously lowered.

In a seat equipped with such synchronism between the movements of the back rest and squab, it will be understood that, when the leg rest is essentially vertical and the foot rest is sufficiently brought out, the lowering of the squab during the movement of the back rest can cause the bottom end of the foot rest to come into contact notably with the floor, the foot rest/leg rest assembly being supported solely by the end of the squab. When the squab is lowered, the foot rest/leg rest assembly is then subjected to high mechanical stresses which may damage it.

Generally it will be understood that the effect of the movement of a seat element under the control of an actuator may cause damage to other elements of the seat when the latter comes into contact with an obstacle.

The aim of the invention is to afford a solution to this problem by proposing a method of managing the kinematics of the seat preventing an element of the seat driven by another element of the seat from undergoing excessive mechanical stresses, when an actuator acting indirectly on it is actuated.

To this end, the object of the invention is a method of managing the kinematics of a seat of the aforementioned type, characterised in that, when a first actuator is actuated in at least one direction, it includes a step of actuating a second actuator first of all in one given direction and then in the opposite direction.

According to particular embodiments, the method includes one or more of the following characteristics:

the actuation of the second actuator in the given direction is effected for a first predetermined duration;
the actuation of the second actuator in the opposite direction is effected for a second predetermined duration;
the first and second predetermined durations are such that, according to the speed of movement of the second actuator in the given direction and in the opposite direction, the movement travels in the two directions are substantially identical;
before the step of actuating the second actuator in the said given direction, it includes a step of measuring and storing the current position of the second actuator, and the actuation of the second actuator in the said opposite direction is effected at most until the second actuator returns to the said stored position;
it includes a step of monitoring at least one variable characteristic of the force produced by the second actuator, during its use in the said opposite direction, and a step of estimating at least one predetermined evaluation criterion relating to the characteristic variable or variables, and it includes a step of actuating the second actuator according to a predefined actuation instruction, putting an end to its movement in the said opposite direction, when at least one of the predetermined evaluation criteria is satisfied;
the said predetermined actuation instruction is an instruction chosen from the group consisting of the stoppage of the second actuator and the driving of the second actuator in the said given direction; and
at least one variable characteristic of the force produced is a variable characteristic of the electric current consumed by the second actuator chosen from the group consisting of the intensity consumed by the actuator and a derivative with respect to the time of the intensity consumed by the actuator.

Another object of the invention is a seat including at least at least three seat elements movable with respect to each other and at least two actuators for the movement of the three elements with respect to each other, characterised in that it has means of actuating a first actuator in one direction and automatic means of actuating a second actuator first of all in a given direction and then in the opposite direction, when the first actuator is actuated in at least one direction.

According to particular embodiments, the seat has one or more of the following characteristics:
it has:
  a movable squab;
  a back rest articulated on the squab;
  a leg rest articulated on the squab; and
  a foot rest mounted so as to be able to move with respect to the leg rest; and
  the first actuator is adapted for the conjoint movement of the back rest and squab whilst providing the lowering of the seat when the back rest is moved upright; and
  the second actuator is adapted for the movement of the foot rest with respect to the leg rest; and
it has:
  a movable squab;
  a back rest articulated on the squab; and
  a leg rest articulated on the squab; and
  the first actuator is adapted for the conjoint movement of the back rest and squab whilst providing the lowering of the squab when the back rest is moved upright; and
  the second actuator is adapted for the movement of the leg rest with respect to the squab.

The invention will be better understood from a reading of the following description, given solely by way of example and made with reference to the accompanying drawings, in which.

Figure 1:
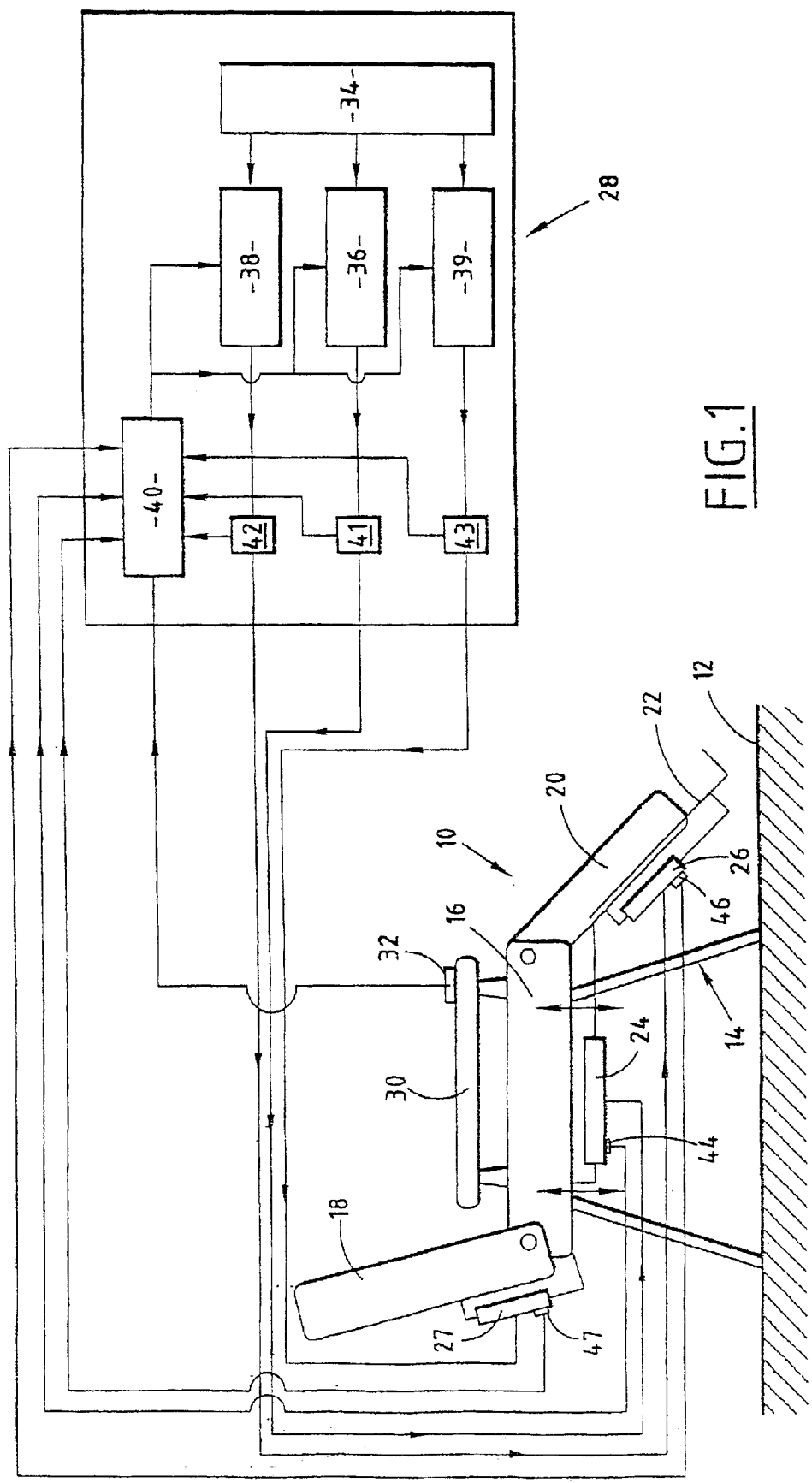
FIG. 1 is a schematic view of a vehicle seat according to the invention.

The seat 10 depicted in FIG. 1 is a passenger seat for an aircraft. This seat is fixed to the floor 12 of the aircraft.

The seat 10 has a base 14 fixed to the floor 12 on which a substantially horizontal squab 16 rests.

At one end of the squab there is articulated a back rest 18 able to move between a substantially vertical raised position and a substantially horizontal folded-down position.

The squab 16 is mounted so as to be able to move with respect to the base 14 in a vertical direction. A mechanism known per se lowers the squab 16 when the back rest 18 is brought to its raised position and raises the squab 16 when the back rest 18 is returned to its folded-down position.

At the other end of the squab 16 there is articulated a leg rest 20 able to move between a substantially vertical folded-down position below the squab 16 and a substantially horizontal extended position in line with the squab 16. The leg rest is carried by the squab 16.

The seat 10 also has a foot rest 22 mounted so as to move slidably with respect to the leg rest 20 in line with it.

The foot rest 22 is able to move between a retracted position within the leg rest 20 and an extended position in which it extends the latter and is practically completely extended.

A first electrical actuator 24 is mounted between the squab 16 and the leg rest 20 in order to provide a movement of the latter between its folded-down position and its extended position.

Likewise, a second actuator 26 is provided between the leg rest 20 and the foot rest 22 in order to provide the movement of the foot rest between its retracted position and its extended position.

A third actuator 27 is mounted between the squab 16 and the back rest 18 in order to provide the movement of the back rest between its raised position and its folded-down position.

The three actuators function at constant speeds, which may be different from one actuator to the other.

Each of the three actuators 24, 26 and 27 is supplied with electric current from a central control unit 28. This control unit is connected separately to each of the actuators 24, 26 and 27 in order to provide their independent control.

In addition, the seat has an arm rest 30, to which there is fixed a control keypad 32 affording independent control of the actuators 24, 26 and 27 in order to cause their movement.

The unit 28 has a source 34 for supplying the actuators. This is formed for example by a transformer connected to the general electrical supply system of the aircraft by adapted connection means.

For each actuator there is provided a supply interface 36, 38 and 39 providing the supply of the actuators, respectively 24, 26 and 27, from the supply source 34. These interfaces provide the shaping of the supply current for the actuators according to the required direction of actuation.

The supply interfaces 36, 38 and 39 are controlled by an information processing unit 40. This unit 40 is connected to the control keypad 32, in order to receive the control instructions from the passenger.

The information processing unit 40 has for example a microprocessor for implementing an adapted program described later in the description.

The unit 40 also has a clock enabling the microprocessor to implement one or more timings in order to manage the duration of functioning of the different actuators.

Between the supply interfaces 36, 38, 39 and the actuators, respectively 24, 26 and 27, there are disposed means denoted respectively 41, 42, 43, intended for monitoring variables characteristic of the electric current consumed by the actuators 24, 26 and 27 during their functioning. These monitoring means are connected to the central information processing unit 40.

The variables characteristic of the electric current consumed by the actuators represent the force produced by the actuator in question.

For example, each of the monitoring means 41 to 43 is adapted to determine the instantaneous intensity consumed by the associated actuator, during its operating phase.

Finally, each actuator 24, 26 and 27 is equipped with one or more position sensors.

These sensors, designated by the reference 44, 46 and 47 respectively for the actuators 24, 26 and 27, are connected to the information processing unit 40. Thus the unit 40 is informed of the current position of each actuator.

These sensors are formed for example by potentiometers or microcontacts located between the fixed and movable parts of the actuators.

For the functioning of the seat, the information processing unit 40 implements a program, known per se, adapted to control the supply interfaces 36, 38 and 39 so that these provide the supply to the actuators 24, 26 and 27 in one direction or the other by reversal of the direction of current, as a function of the information received from the unit 40.

Figure 2:
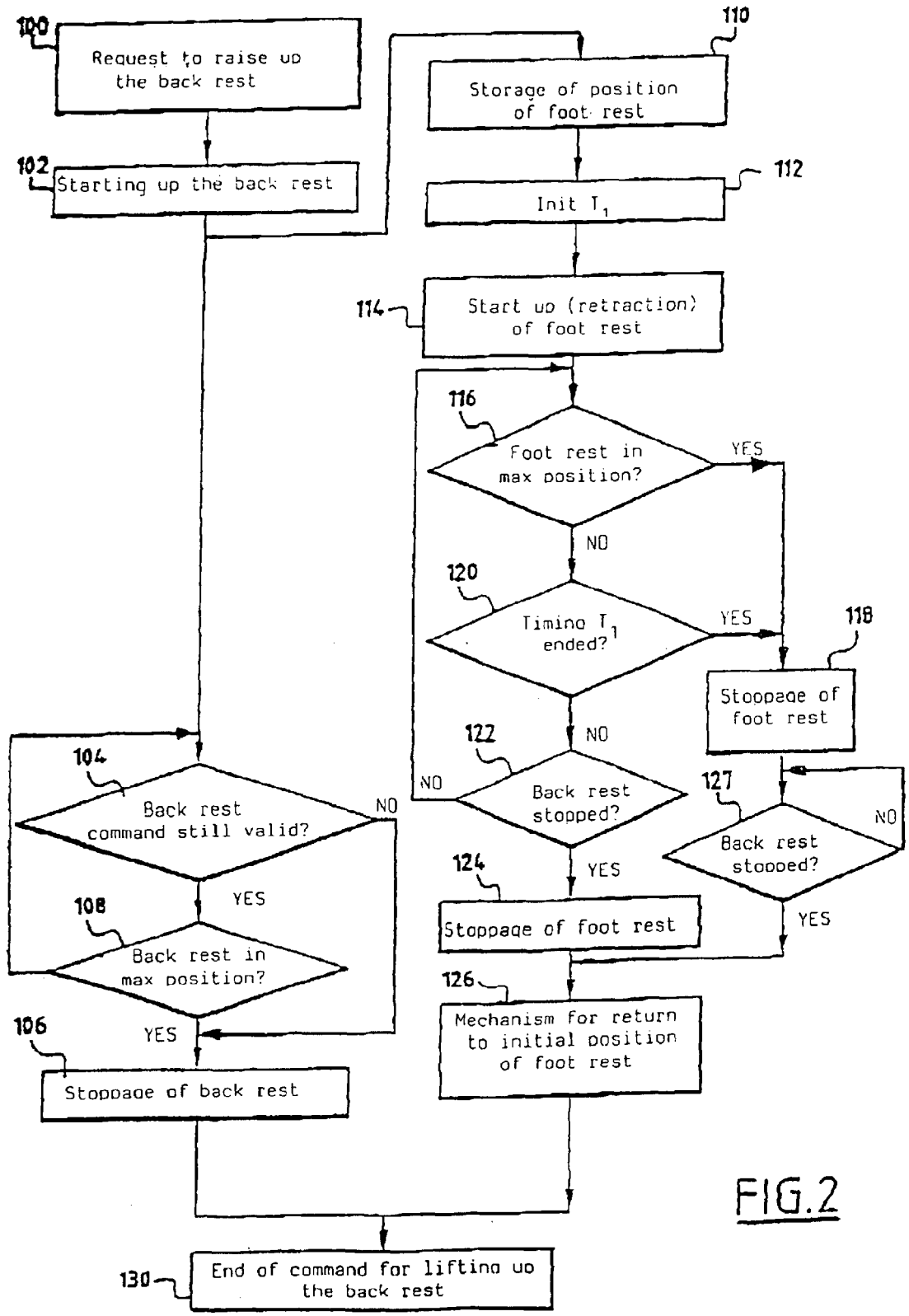
FIG. 2 is a flow diagram explaining the functioning of the seat through the implementation of the method of managing its kinematics according to the invention.

FIG. 2 shows the flow diagram of the program implemented by the information processing unit when the seat back rest is raised up to its raised position.

Thus, when, at step 100, the passenger controls, by pressing on the appropriate key on the keypad 32, the raising up of the backrest, the actuator 27 is started up, at step 102, in order to actuate the back rest 18 to its raised position. It should be noted that, simultaneously with the raising up of the back rest, the squab 16 is progressively lowered.

During the functioning of the actuator 27, a first test 104 is effected in order to check that the control for raising up the back rest is still valid, that is to say that the user of the seat is still pressing the corresponding key on the keypad. If such is not the case, the stoppage of the actuator 27 acting on the back rest is controlled at step 106.

If the control is still valid, it is checked, at step 108, that the back rest 18 has not reached its maximum raised position. This check is carried out from information transmitted by the position sensor 47. If the maximum position is reached, the stoppage of the back rest is also controlled at step 106.

On the other hand, as long as the user maintains his back rest raising-up control, and the back rest has not reached its maximum position, the actuator 27 continues to function.

In parallel with the test carried out on the actuator 27 acting on the back rest and the squab, a step 110 of storing the position of the leg rest is formed immediately after the actuator 27 is started up, at step 102. This storage, carried out by the information processing unit 40, relates to the position value measured by the sensor 46 associated with the actuator 26 allowing the movement of the foot rest 22 with respect to the leg rest 20.

At the following step 112, a timing of a predetermined duration $T_1$ is triggered. At step 114, the functioning of the actuator 26 controlling the foot rest 22 is triggered. The actuator is started up in a first direction, causing a retraction of the foot rest 22 and thus a reduction in the total length of the assembly formed by the leg rest 20 and the foot rest 22.

A set of tests is then carried out in a loop in order to determine whether the functioning of the actuator 26 acting on the foot rest 22 must be stopped.

A first test 116 determines whether the foot rest 22 is in its totally retracted position. This first test is carried out for example from the position of the actuator 26 supplied by the sensor 46.

If the foot rest is actually in this maximum position, stoppage of the actuator 26 is demanded during a step 118. Otherwise the test of step 120 is implemented.

This test aims to determine whether or not the timing $T_1$ initiated at step 112 has ended. If such is the case, the stoppage of the foot rest is demanded at step 118.

On the other hand, if the timing has not come to an end, it is determined, at step 122, whether or not the back rest is stopped. This stoppage may result from a malfunctioning of the seat or from the fact that the back rest has reached its totally raised position and the back rest has been stopped at step 106 after the condition of the test carried out at step 108 has been satisfied.

The tests of steps 116 to 122 are implemented successively in a loop as long as one of the stoppage conditions is not satisfied.

If the back rest is actually stopped, the stoppage of the actuator 26 controlling the foot rest is demanded at step 124.

After the stoppage of the foot rest, at step 118 or 124, it is redriven, at step 126, by the actuator 26 to its initially stored position, the actuator 26 being controlled in a direction opposite to its initial control direction. Thus the actuator is then controlled in order to cause extraction of the foot rest.

However, before the implementation of step 126, when the foot rest is stopped at step 118, a test 127 is carried out after step 118 in order to trigger step 126 only when the back rest 18 is actually stopped.

For this purpose, the test step 126 is effected in a loop until it is verified.

The detail of step 126 will be described with regard to the flow diagram in FIG. 3.

At the end of steps 106 and 126, the algorithm for raising up the back rest is ended at step 130.

Figure 3:
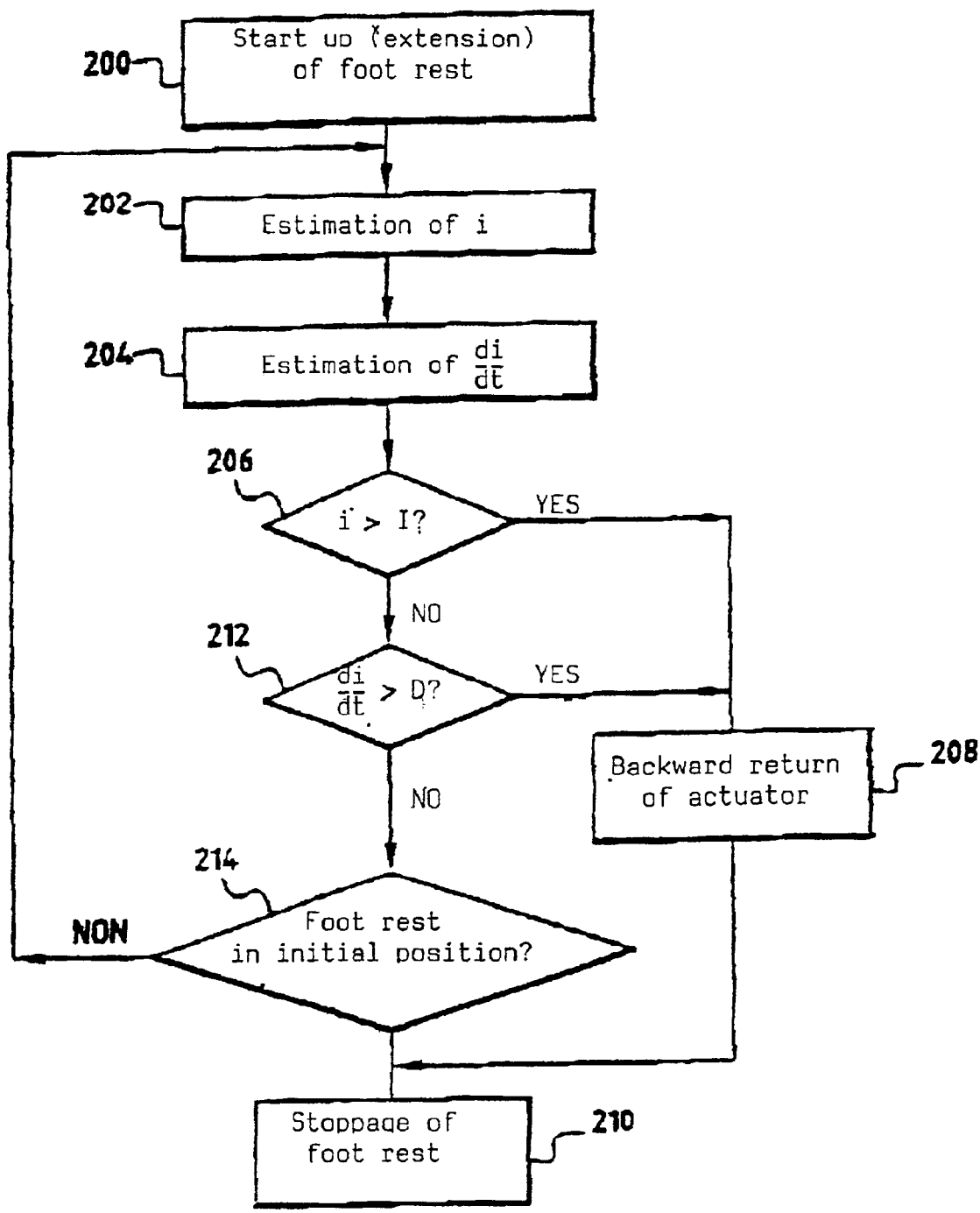
FIG. 3 is a flow diagram explaining the functioning of the seat during an elementary phase of the management method, the function of this phase being to return the foot rest to its initial position.

The flow diagram given in FIG. 3 is that of the algorithm used at step 126 for returning the foot rest to its initial position stored at step 110.

Initially, at step 200, the actuator 26 is started up in order to cause the extension of the foot rest. Thus the actuator 26 is actuated in the opposite direction compared with the direction in which it was actuated at step 114.

The algorithm next includes a step 202 of estimating the intensity i of the current consumed by the actuator 26. This intensity is supplied to the information processing unit 40 by the monitoring means 42.

At step 204, the central information processing unit 40 collects an estimate of the drift with respect to time di/dt of the intensity of the current consumed. This estimation is produced by calculating the time drift of the intensity i supplied by the monitoring means 42.

A test is carried out at step 206 in order to compare the intensity i estimated with a threshold value I stored in the information processing unit 40.

This threshold value I is fixed experimentally and corresponds to a minimum current value consumed by the actuator 26 when the foot rest strikes an obstacle, whilst it is returning to its extended position.

If the value of the intensity i of the current supplied by the monitoring means 42 is greater than the threshold value I, a backward return of the actuator over a short travel is demanded at step 208 by the information processing unit 40 controlling the interface 38 in this regard. The backward return is effected for example during a brief predetermined period of time during which the motor of the actuator 26 is rotated in the reverse direction.

As a variant, the backward return is effected over a brief travel predetermined by the actuator, the control of the latter being provided by the sensor 26.

At the end of this brief backward return, at step 208, the stoppage of the actuator 26 is demanded at step 210, thus ending step 126 of the algorithm illustrated in FIG. 2.

On the other hand, if, at step 206, the intensity i estimated is less than the predetermined threshold, a second test is carried out at step 212. During this step, the value di/dt of the drift with respect to time of the intensity i of the current consumed by the actuator 26 is compared with a threshold value D stored in the information processing means 40. This threshold value D corresponds to a minimum value of the drift with respect to time of the intensity of the current consumed by the actuator 26 when the foot rest 22 strikes an obstacle, whilst it is being returned to its extended position. If the estimated value of the drift with respect to time di/dt of the intensity of the current consumed is greater than the threshold value D, step 208 leading to a brief backward return of the actuator is implemented.

On the other hand, if this condition is not fulfilled, the functioning of the actuator in its direction tending to cause the extension of the foot rest 22 is continued and step 214 is implemented. During this step, a test is carried out aimed at determining whether the foot rest 22 has or has not reached its initial position stored at step 110.

If this initial position is not reached, the successive steps 204 to 212 are once again implemented. On the other hand, if this initial position is reached, the stoppage of the foot rest is demanded at step 210.

The return of the foot rest into its initial position is estimated by the information processing unit from the current position of the actuator supplied by the sensor 46.

It will be understood that, with a control of the actuators as described here, when the back rest is controlled towards its upright position, leading to a lowering of the squab, the foot rest 22 is, concomitantly with the movement of the back rest, moved first of all in a direction resulting in its retraction and then in an opposite direction resulting in a movement towards its extended position.

Thus, when the squab is lowered under the effect of the raising up of the back rest, the assembly formed by the leg rest and foot rest is not mechanically stressed whilst being pressed against the floor even if, at the time of actuating the back rest, the foot rest is close to or already in contact with the floor.

This solution thus makes it possible not to cause fatigue on the seat structure and on the elements affording its actuation. On the other hand, since the purpose of the method used is not to prevent the bottom end of the foot rest striking the floor, the foot rest can be taken into all accessible positions. In particular, the command to return the foot rest to its initial position enables it to be brought as close as possible to the position which it occupied before the actuation of the back rest.

The method described here for the movement of the back rest and foot rest can be applied for all the other elements of the seat, which, during their movement, have an influence on each other and may cause one of the seat elements to come into contact with an obstacle.

Step 208 is optional. Thus, if one of the tests carried out at steps 206 and 212 is satisfied, the stoppage of the foot rest is controlled directly at step 210.

As a variant, the step 110 of storing the position is eliminated and the test of step 214 is replaced by the implementation of a second timing $T_2$ initiated when the foot rest is started up at step 200. The duration of this timing is such that, according to the speed of the actuator in its two directions of movement, the movement travels during the periods $T_1$ and $T_2$ are substantially identical.

Thus, in this variant, the timing is initiated when the actuator is started up at step 200 and the test carried out at step 214 verifies that the timing has reached its end.

According to yet another variant implementation of the method, during the raising of the back rest, the leg rest is raised at least partially in replacement for the retraction of the foot rest.

Likewise, according to yet another variant, the leg rest is partially raised simultaneously with the retraction of the foot rest.

In both cases, the leg rest is returned to its initial position after the stoppage of the back rest.

What is claimed is:

1. A method of managing the kinematics of a seat, said seat having at least three seat elements that are able to move with respect to each other and said seat having at least two actuators actuable in different directions for moving the three elements with respect to each other, said method comprising the step of:

actuating a first actuator of said at least two actuators in one direction, said actuating of the first actuator step always including a step of actuating a second actuator of said at least two actuators in a given direction and then in an opposite direction to said given direction.

2. A method according to claim 1, wherein the actuating step of the second actuator in said given direction is effected for a first predetermined duration.

3. A method according to claim 2, wherein the actuating step of the second actuator in said opposite direction is effected for a second predetermined duration.

4. A method according to claim 3, wherein the first and second predetermined durations are such that, according to a speed of movement of the second actuator in the given direction and in the opposite direction, the movement travels in both the given and opposite directions are substantially identical.

5. A method according to claim 1, wherein, before the movement of the second actuator in said given direction, the step of activating the second actuator includes a step of measuring and storing a current position of the second actuator, and wherein the actuating step of the second actuator in said opposite direction is effected at most until the second actuator returns to said stored position.

6. A method according to claim 1, wherein the method includes a step of monitoring at least one variable characteristic of a force produced by the second actuator during actuation thereof in said opposite direction, and a step of estimating at least one predetermined evaluation criterion relating to a characteristic variable or variables, and wherein the method includes a step of actuating the second actuator in accordance with a predefined control instruction, ending the movement of the second actuator in the opposite direction, when at least one of the predetermined evaluation criteria is satisfied.

7. A method according to claim 6, wherein said predetermined control instruction is an instruction chosen from a group consisting of a stoppage of the second actuator and a driving of the second actuator in said given direction.

8. A method according to claim 6, wherein the second actuator consumes electric current and wherein at least one variable characteristic of the force produced is a variable characteristic of an electric current consumed by the second actuator chosen from a group consisting of an intensity consumed by the second actuator and a drift with respect to a time of the intensity consumed by the second actuator.

9. A seat having at least three seat elements able to move with respect to each other and at least two actuators for moving the three elements with respect to each other, wherein the seat further has means of actuating a first actuator of said at least two actuators in one direction and automatic means of actuating a second actuator of said at least two actuators in a given direction and then in an opposite direction, whenever said first actuator is actuated in said one direction.

10. A seat according to claim 9, further including:

a movable squab;

a back rest articulated on the squab;

a leg rest articulated on the squab;

a foot rest mounted so as to be able to move with respect to the leg rest; and wherein said first actuator is adapted for a conjoint movement of the back rest and of the squab by providing a lowering of the squab when the back rest is raised up; and wherein the second actuator is adapted for a movement of the foot rest with respect to the leg rest.

11. A seat according to claim 9, further including:

a movable squab;

a back rest articulated on the squab;

a leg rest articulated on the squab; and wherein said first actuator is adapted for a conjoint movement of the back rest and of the squab by providing a lowering of the squab when the back rest is raised up; and wherein said second actuator is adapted for a movement of the leg rest with respect to the squab.

* * * * *